US011870779B2

United States Patent
Mondello et al.

(10) Patent No.: US 11,870,779 B2
(45) Date of Patent: *Jan. 9, 2024

(54) VALIDATING AN ELECTRONIC CONTROL UNIT OF A VEHICLE

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,592

(22) Filed: May 6, 2022

(65) Prior Publication Data

US 2022/0272090 A1 Aug. 25, 2022

Related U.S. Application Data

(63) Continuation of application No. 16/362,997, filed on Mar. 25, 2019, now Pat. No. 11,329,983.

(51) Int. Cl.
*H04L 9/32* (2006.01)
*H04L 9/40* (2022.01)
(Continued)

(52) U.S. Cl.
CPC ........ *H04L 63/0876* (2013.01); *B60R 16/023* (2013.01); *H04L 9/3236* (2013.01); *H04L 67/12* (2013.01)

(58) Field of Classification Search
CPC ... H04L 63/0876; H04L 63/12; H04L 9/3236; H04L 9/0894; H04L 9/3239;
(Continued)

(56) References Cited

U.S. PATENT DOCUMENTS 10,507,795 B1 * 12/2019 Schubert ............... B60R 25/241
2002/0147918 A1 10/2002 Osthoff et al.
(Continued)

FOREIGN PATENT DOCUMENTS

CN 109245904 A 1/2019
CN 109417480 A 3/2019
(Continued)

OTHER PUBLICATIONS

U.S. Appl. No. 15/853,498, entitled, "Physical Unclonable Function Using Message Authentication Code", filed Dec. 22, 2017, 28 pages.
(Continued)

*Primary Examiner* — Khoi V Le
(74) *Attorney, Agent, or Firm* — Brooks, Cameron & Huebsch, PLLC

(57) ABSTRACT

The present disclosure includes apparatuses, methods, and systems for validating an electronic control unit of a vehicle. An embodiment includes a memory, and circuitry configured to generate a run-time cryptographic hash based on an identification (ID) number of an electronic control unit of a vehicle and compare the run-time cryptographic hash with a cryptographic hash stored in a portion of the memory.

17 Claims, 10 Drawing Sheets

(51) Int. Cl.
*B60R 16/023* (2006.01)
*H04L 67/12* (2022.01)

(58) Field of Classification Search
CPC ... H04L 9/3247; H04L 9/0643; H04L 9/0866; H04L 9/3226; H04L 67/12; H04L 2209/84; B60R 16/023; G06F 21/44
See application file for complete search history.

(56) References Cited

U.S. PATENT DOCUMENTS

| | | | |
|---|---|---|---|
| 2004/0003233 A1* | 1/2004 | Reinold | H04L 63/0823 713/155 |
| 2014/0114497 A1 | 4/2014 | Miyake | |
| 2014/0298448 A1 | 10/2014 | Nagai et al. | |
| 2015/0222604 A1* | 8/2015 | Ylonen | H04L 9/3263 713/171 |
| 2017/0060559 A1* | 3/2017 | Ye | G06F 8/65 |
| 2017/0302693 A1 | 10/2017 | Takada et al. | |
| 2018/0012433 A1* | 1/2018 | Ricci | B60L 53/65 |
| 2020/0177398 A1* | 6/2020 | Takemori | H04L 63/0823 |

FOREIGN PATENT DOCUMENTS

| | | |
|---|---|---|
| JP | 2010-011400 A | 1/2010 |
| JP | 2012-048488 A | 3/2012 |
| JP | 2012-221246 A | 11/2012 |
| JP | 2013-017140 A | 1/2013 |
| JP | 2016-072669 A1 | 5/2016 |
| JP | 2018-019415 A | 2/2018 |
| KR | 10-2011-0063245 A | 6/2011 |
| WO | 2015-084232 A1 | 6/2015 |
| WO | 2016047462 A1 | 3/2016 |

OTHER PUBLICATIONS

U.S. Appl. No. 16/201,652, entitled, "Parking Infrastructure Powered By a Decentralized, Distributed Database", filed Nov. 27, 2018, 27 pages.
U.S. Appl. No. 15/993,119, entitled, "Transmission of Vehicle Route Information by Passive Devices", filed May 30, 2018, 25 pages.
U.S. Appl. No. 16/034,763, entitled, "Secure Vehicular Communication", filed Jul. 13, 2018, 37 pages.
U.S. Appl. No. 16/034,809, entitled, "Secure Vehicular Services Communication", filed Jul. 13, 2018, 36 pages.
PCT International Application No. PCT/IB2019/000089, entitled, "Method for Improving Safety of a Component or System Running a Firmware or a Finite State Machine", filed Feb. 22, 2019, 42 pages.
U.S. Appl. No. 15/851,325, entitled, "Providing Autonomous Vehicle Maintenance", filed Dec. 21, 2017, 48 pages.
International Search Report and Written Opinion from related International Application No. PCT/US2020/021815, dated Jul. 2, 2020, 13 pages.

* cited by examiner

VALIDATING AN ELECTRONIC CONTROL UNIT OF A VEHICLE

PRIORITY INFORMATION

This application is a Continuation of U.S. application Ser. No. 16/362,997, filed on Mar. 25, 2019, which will issue as U.S. Pat. No. 11,329,983 on May 10, 2022, the contents of which are incorporated herein by reference.

TECHNICAL FIELD

The present disclosure relates generally to semiconductor memory and methods, and more particularly, to validating an electronic control unit of a vehicle.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

Memory devices can be utilized in vehicles (e.g., automobiles, cars, trucks, buses, etc.). In conventional motor vehicles the driver operates the vehicle's control system. For example, the driver of a conventional motor vehicle makes decisions regarding the safe operation of the vehicle. Such decisions may include decisions related to the speed of the vehicle, steering of the vehicle, obstacle and/or hazard recognition, and obstacle and/or hazard avoidance. However, a driver's ability to make these decisions and operate the vehicle's control system may be limited in some situations. For example, driver impairment, fatigue, attentiveness, and/or other factors such as visibility (e.g., due to weather or changes in terrain) may limit a driver's ability to safely operate a conventional motor vehicle and/or its control system.

In order to alleviate the deficiencies resulting from driver operation of a conventional motor vehicle, various manufacturers have experimented with autonomous vehicles. While autonomous vehicles may allow for a reduction in issues that may arise as a result of the driver's ability to operate the conventional motor vehicle becoming lessened, autonomous vehicles have their own shortcomings.

For example, autonomous vehicles require reliable components because failure of one or more system components could result in injury or death to passengers in the autonomous vehicle. Autonomous vehicles can include a number of electronic control units (e.g., hardware) working together to perform particular functions. When hardware is replaced on a vehicle, sometimes original hardware is replaced with unoriginal hardware or a person without training or improper training can install the hardware incorrectly. The reliability of components in an autonomous vehicle can be ensured by installing hardware provided by the factory (e.g., original hardware) and having the hardware installed by authorized mechanics, for example.

DETAILED DESCRIPTION

Figure 1:
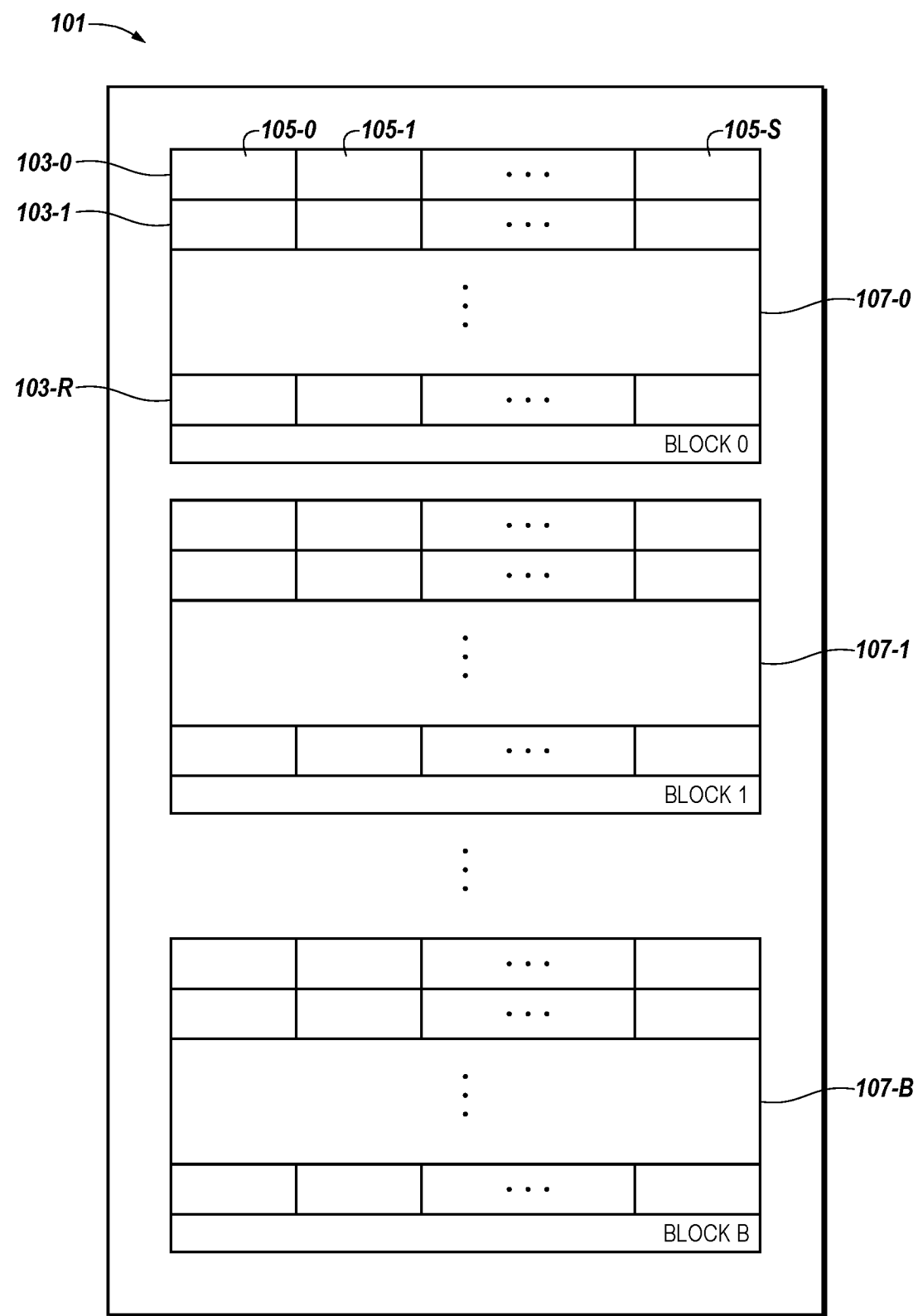
FIG. 1 illustrates a diagram of a portion of a memory array having a number of physical blocks in accordance with an embodiment of the present disclosure.

The present disclosure includes apparatuses, methods, and systems for validating an electronic control unit of a vehicle. An embodiment includes a memory, and circuitry configured to generate a run-time cryptographic hash based on an identification (ID) number of an electronic control unit of a vehicle and compare the run-time cryptographic hash with a cryptographic hash stored in a portion of the memory.

Many electronic control units work together to operate a vehicle. When hardware is replaced on a vehicle, sometimes original hardware is replaced with unoriginal hardware or a person without training or improper training replaces the hardware. Unoriginal hardware and/or improper installation can lead to the vehicle malfunctioning.

As such, in order to ensure a safe vehicle, it is important to validate (e.g., authenticate and/or attest) that the hardware installed in the vehicle is genuine (e.g., is the same as originally programmed) and installed properly. Validating the hardware of a vehicle can also ensure the warranty of the electronic control unit because only authentic and original replacement parts can be used. When purchasing or selling the car, both parties can be sure that the vehicle is as sold by the car manufacturer.

Embodiments of the present disclosure can validate an electronic control unit at startup of the vehicle. For instance, embodiments of the present disclosure can detect a power on of a vehicle and compare the run-time cryptographic hash with a cryptographic hash stored in a portion of the memory in response to detecting the power on of the vehicle.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "R", "B", "S", and "N", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

FIG. 1 illustrates a diagram of a portion of a memory array 101 having a number of physical blocks in accordance with an embodiment of the present disclosure. Memory array 101 can be, for example, a flash memory array such as a NAND flash memory array. As an additional example, memory array 101 can be a resistance variable memory array such as a PCRAM, RRAM, MMRAM, or spin torque transfer (STT) array, among others. However, embodiments of the present disclosure are not limited to a particular type of memory array. Further, memory array 101 can be a secure memory array, as will be further described herein. Further, although not shown in FIG. 1, memory array 101 can be located on a particular semiconductor die along with various peripheral circuitry associated with the operation thereof.

As shown in FIG. 1, memory array 101 has a number of physical blocks 107-0 (BLOCK 0), 107-1 (BLOCK 1), . . . , 107-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 101 may be 128 blocks, 512 blocks, or 1,024 blocks, but embodiments are not limited to a particular power of two or to any particular number of physical blocks in memory array 101.

A number of physical blocks of memory cells (e.g., blocks 107-0, 107-1, . . . , 107-B) can be included in a plane of memory cells, and a number of planes of memory cells can be included on a die. For instance, in the example shown in FIG. 1, each physical block 107-0, 107-1, . . . , 107-B can be part of a single die. That is, the portion of memory array 101 illustrated in FIG. 1 can be a die of memory cells.

As shown in FIG. 1, each physical block 107-0, 107-1, . . . , 107-B includes a number of physical rows (e.g., 103-0, 103-1, . . . , 103-R) of memory cells coupled to access lines (e.g., word lines). The number of rows (e.g., word lines) in each physical block can be 32, but embodiments are not limited to a particular number of rows 103-0, 103-1, . . . , 103-R per physical block. Further, although not shown in FIG. 1, the memory cells can be coupled to columns of sense lines (e.g., data lines and/or digit lines).

As one of ordinary skill in the art will appreciate, each row 103-0, 103-1, . . . , 103-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 103-0, 103-1, . . . , 103-R comprises one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 1, a page of memory cells can comprise a number of physical sectors 105-0, 105-1, . . . , 105-S (e.g., subsets of memory cells). Each physical sector 105-0, 105-1, . . . , 105-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 105-0, 105-1, . . . , 105-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 107-0, 107-1, . . . , 107-B, rows 103-0, 103-1, . . . , 103-R, sectors 105-0, 105-1, . . . , 105-S, and pages are possible. For example, rows 103-0, 103-1, . . . , 103-R of physical blocks 107-0, 107-1, . . . , 107-B can each store data corresponding to a single logical sector which can include, for example, more or less than 512 bytes of data.

Figure 2:
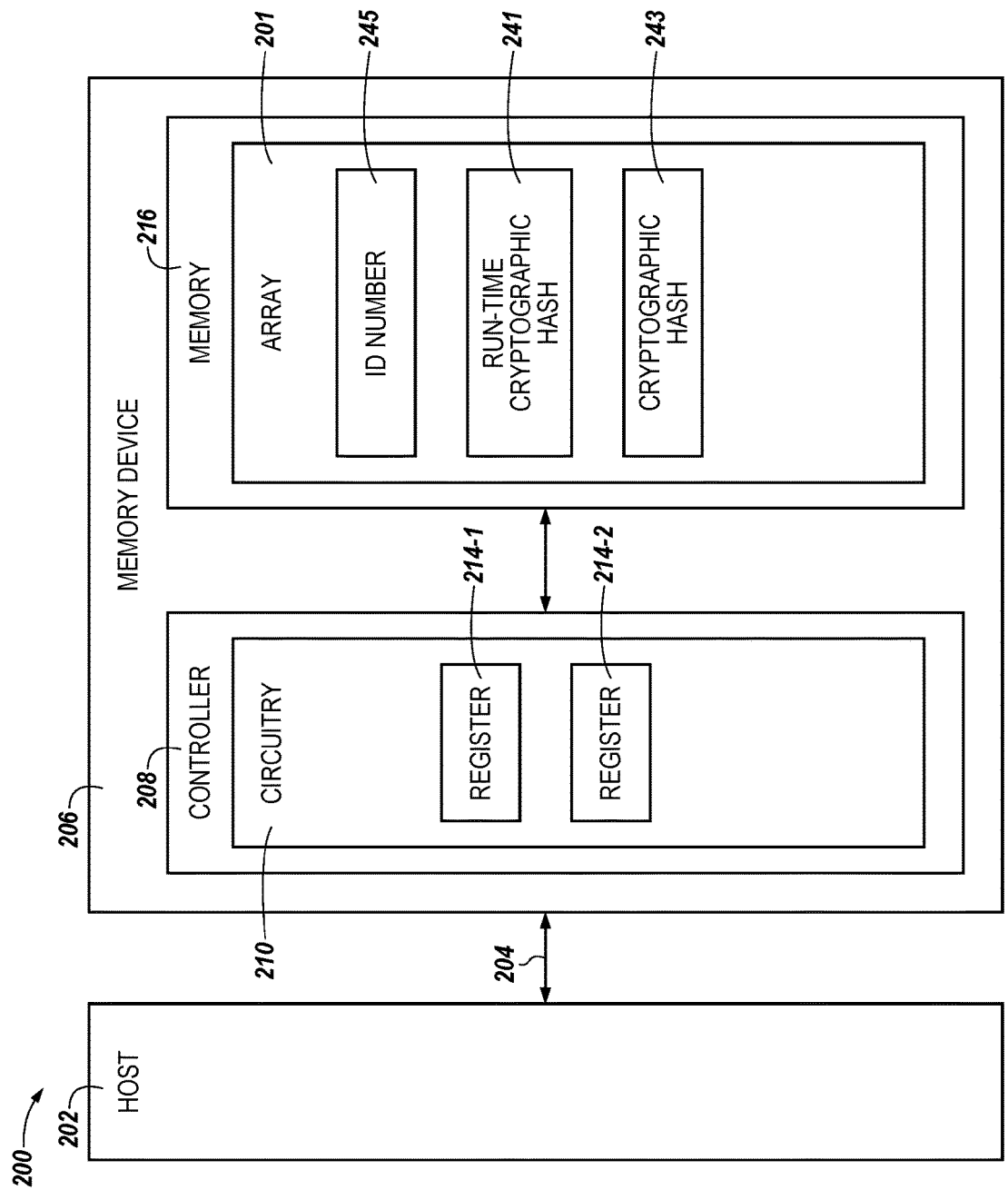
FIG. 2 is a block diagram of a computing system including a host and an apparatus in the form of a memory device in accordance with an embodiment of the present disclosure.

FIG. 2 is a block diagram of a computing system 200 including a host 202 and an apparatus in the form of a memory device 206 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 200 can include a number of memory devices analogous to memory device 206.

In the embodiment illustrated in FIG. 2, memory device 206 can include a memory 216 having a memory array 201. Memory array 201 can be analogous to memory array 101 previously described in connection with FIG. 1. Further, memory array 201 can be a secure array, as will be further described herein. Although one memory array 201 is illustrated in FIG. 2, memory 216 can include any number of memory arrays analogous to memory array 201.

As illustrated in FIG. 2, host 202 can be coupled to the memory device 206 via interface 204. Host 202 and memory device 206 can communicate (e.g., send commands and/or data) on interface 204. Host 202 and/or memory device 206 can be, or be part of, an Internet of Things (IoT) enabled device, such as, for instance, an automotive (e.g., vehicular and/or transportation infrastructure) IoT enabled device, among other host systems, and can include a memory access device (e.g., a processor). One of ordinary skill in the art will appreciate that "a processor" can intend one or more processors, such as a parallel processing system, a number of coprocessors, etc.

Interface 204 can be in the form of a standardized physical interface. For example, when memory device 206 is used for information storage in computing system 200, interface 204 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 204 can provide an interface for passing control, address, information (e.g., data), and other signals between memory device 206 and a host (e.g., host 202) having compatible receptors for interface 204.

Memory device 206 includes controller 208 to communicate with host 202 and with memory 216 (e.g., memory array 201). For instance, controller 208 can send commands to perform operations on memory array 201, including operations to sense (e.g., read), program (e.g., write), move, and/or erase data, among other operations.

Controller 208 can be included on the same physical device (e.g., the same die) as memory 216. Alternatively, controller 208 can be included on a separate physical device that is communicatively coupled to the physical device that includes memory 216. In an embodiment, components of controller 208 can be spread across multiple physical devices (e.g., some components on the same die as the memory, and some components on a different die, module, or board) as a distributed controller.

Host 202 can include a host controller (not shown FIG. 2) to communicate with memory device 206. The host controller can send commands to memory device 206 via interface 204. The host controller can communicate with memory device 206 and/or the controller 208 on the memory device 206 to read, write, and/or erase data, among other operations. Further, in an embodiment, host 202 can be an IoT enabled device, as previously described herein, having IoT communication capabilities.

Controller 208 on memory device 206 and/or the host controller on host 202 can include control circuitry and/or logic (e.g., hardware and firmware). In an embodiment, controller 208 on memory device 206 and/or the host controller on host 202 can be an application specific integrated circuit (ASIC) coupled to a printed circuit board including a physical interface. Also, memory device 206 and/or host 202 can include a buffer of volatile and/or non-volatile memory and one or more registers.

For example, as shown in FIG. 2, memory device 206 can include circuitry 210. In the embodiment illustrated in FIG. 2, circuitry 210 is included in controller 208. However, embodiments of the present disclosure are not so limited. For instance, in an embodiment, circuitry 210 may be included in (e.g., on the same die as) memory 216 (e.g., instead of in controller 208). Circuitry 210 can comprise, for instance, hardware, firmware, and/or software.

Figure 3:
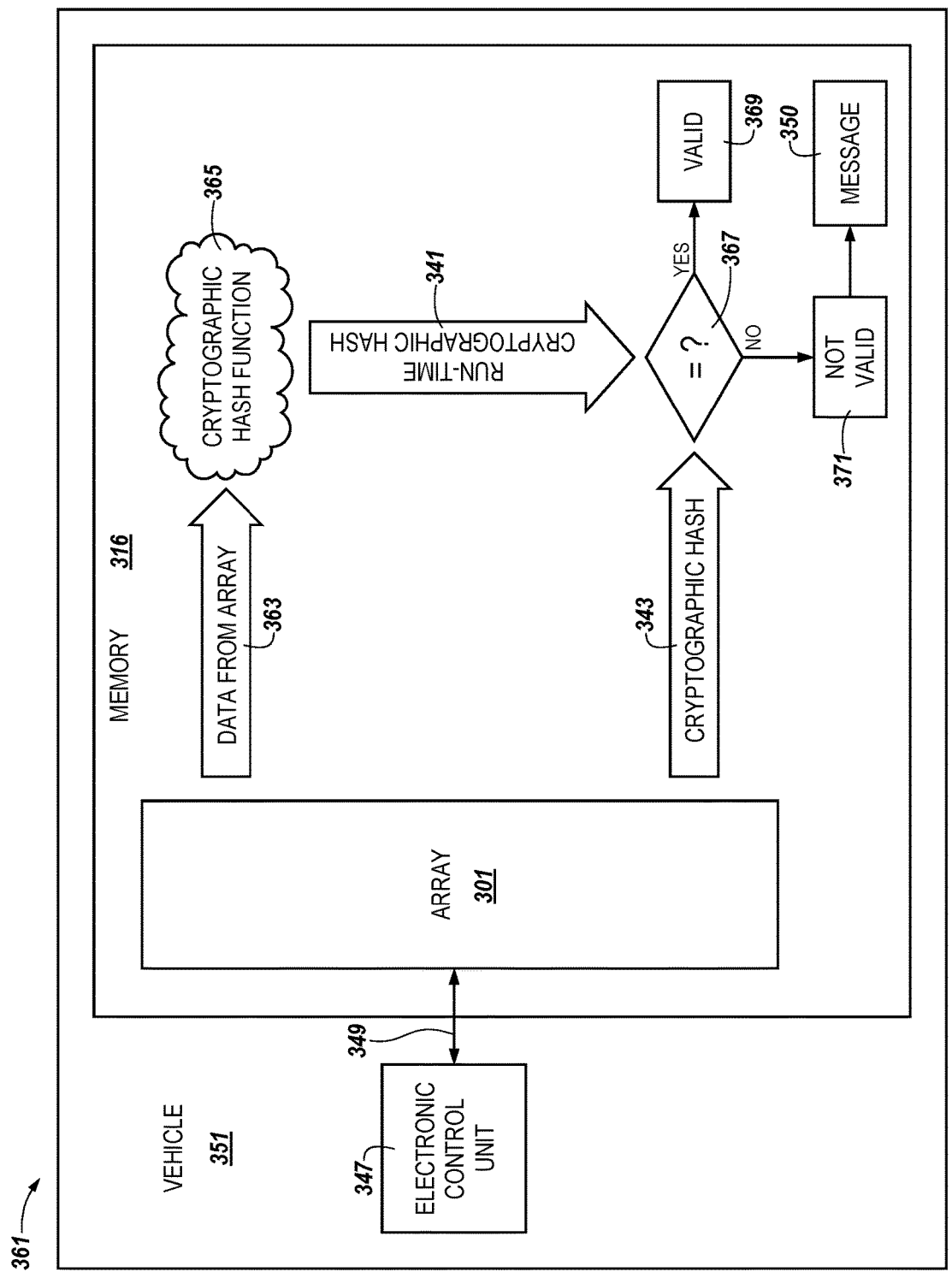
FIG. 3 is a block diagram of an example of an electronic control unit validation process in accordance with an embodiment of the present disclosure.

Circuitry 210 can generate a run-time cryptographic hash 241 for validating (e.g., authenticating and/or attesting) an electronic control unit (e.g., electronic control unit 347 in FIG. 3) of a vehicle (e.g., vehicle 351 in FIG. 3). The generated run-time cryptographic hash 241 can be based on an identification (ID) number 245 of the electronic control unit. The ID number 245 can be a serial number and can be sent from the electronic control unit via an interface (e.g., interface 349 in FIG. 3), for example. The interface can be a serial advanced technology attachment (SATA) physical interface, a peripheral component interconnect express (PCIe) physical interface, a universal serial bus (USB) physical interface, a small computer system interface (SCSI), or a bus, among other physical connectors and/or interfaces. In some examples, the memory device 216 can receive the ID number 245 from the electronic control unit and/or the ID number 245 can be stored in memory 216 (e.g., in memory array 201).

As used herein, validating the electronic control unit (e.g., electronic control unit 347 in FIG. 3) can include, and/or refer to, authenticating and/or attesting that the electronic control unit is genuine (e.g., original, authorized, provided by factory, properly installed, and/or installed by a certified person), and has not been altered or improperly installed. The run-time cryptographic hash 241 of the data, including the ID number 245, stored in memory array 201 can comprise, for instance, a SHA-256 cryptographic hash. Further, the run-time cryptographic hash 241 of the data stored in memory array 201 can comprise 256 bytes of data.

The run-time cryptographic hash 241 of the data stored in memory array 201 can be generated (e.g., calculated), for example, by circuitry 210. In such an example, the run-time cryptographic hash 241 of the data stored can be internally generated by memory device 206 without having external data moving on interface 204. As an additional example, the run-time cryptographic hash 241 of the data can be communicated from an external entity. For instance, host 202 can generate the run-time cryptographic hash 241 of the data stored in memory array 201 and send the generated run-time cryptographic hash 241 to memory device 206 (e.g., circuitry 210 can receive the run-time cryptographic hash 241 of the data stored in memory array 201 from host 202).

The run-time cryptographic hash 241 can be generated (e.g., calculated), for example, by circuitry 210 based on (e.g., responsive to) an external command, such as a command received from host 202. For instance, the run-time cryptographic hash 241 can be generated by reading data stored in memory array 201 and using a cryptographic hash function (e.g., cryptographic hash function 365 in FIG. 3) to hash the data. As an additional example, host 202 can generate the run-time cryptographic hash 241, and send (e.g. provide) the generated run-time cryptographic hash 241 to memory device 206 (e.g., circuitry 210 can receive the run-time cryptographic hash 241 from host 202).

As shown in FIG. 2, run-time cryptographic hash 241 can be stored in memory array 201. For example, the run-time cryptographic hash 241 can be stored in a portion of memory array 201 that is inaccessible to a user of memory device 206 and/or host 202 (e.g., in a "hidden" region of memory array 201).

In an embodiment, memory array 201 (e.g., a subset of array 201, or the whole array 201) can be a secure array (e.g., an area of memory 216 to be kept under control). For example, the data stored in memory array 201 can include sensitive (e.g., non-user) data, such as host firmware and/or code to be executed for sensitive applications. In such an embodiment, a pair of non-volatile registers can be used to define the secure array. For example, in the embodiment illustrated in FIG. 2, circuitry 210 includes registers 214-1 and 214-2 that can be used to define the secure array. For instance, register 214-1 can define the address (e.g., the starting LBA of the data) of the secure array, and register 214-2 can define the size (e.g., the ending LBA of the data) of the secure array.

Once the secure array has been defined, circuitry 210 can generate (e.g., calculate) a cryptographic hash 243 associated with the secure array, which may be referred to herein as a golden hash 243, using authenticated and antireplay protected commands (e.g., so that only memory device 206 knows the golden hash 243, and only memory device 206 is capable of generating and updating it). In some examples, the golden hash 243 can be received by the memory device 206. The golden hash 243 can be sent from a mechanic, dealer, and/or manufacturer, for example. The golden hash 243 may be stored in inaccessible portion of memory array 201 and can be used during the process of validating the electronic control unit (e.g., electronic control unit 347 in FIG. 3) of the vehicle (e.g., vehicle 351 in FIG. 3), as will be further described herein.

Memory device 206 (e.g., circuitry 210) can validate the data (e.g., data 363 in FIG. 3), including the ID number 245 of the electronic control unit (e.g., electronic control unit 347 in FIG. 3), stored in memory array 201. For example, circuitry 210 can validate the data stored in array 201, responsive to a powering (e.g., a powering on and/or powering up) of memory device 206, the electronic control unit, and/or the vehicle (e.g., vehicle 351 in FIG. 3). As such, a validation of the electronic control unit can be initiated (e.g., automatically) upon the powering of memory device 206, the electronic control unit, and/or the vehicle.

As an additional example, circuitry 210 can initiate a validation of the data (e.g., data 363 in FIG. 3) stored in memory array 201. For instance, host 202 can send a command to memory device 206 (e.g., circuitry 210) to initiate a validation of the ID number 245 of the electronic control unit (e.g., electronic control unit 347 in FIG. 3) stored in memory array 201 to determine whether the electronic control unit is authentic.

In embodiments in which memory array 201 is a secure array, the golden hash 243 previously described herein may also be used to validate the data (e.g., data 363 in FIG. 3), including the ID number 245, stored in memory array 201. For example, a run-time cryptographic hash 241 can be generated (e.g., calculated) and compared with the golden hash 243. If the comparison indicates the run-time cryptographic hash 241 and golden hash 243 match (e.g., equal), it can be determined that the ID number 245 is valid (e.g., valid 369 in FIG. 3), and therefore the electronic control unit (e.g., electronic control unit 347 in FIG. 3) is authentic. If, however, the comparison indicates the run-time cryptographic hash 241 and golden hash 243 do not match, this may indicate that the ID number 245 is not valid (e.g., not valid 371 in FIG. 3), and therefore the electronic control unit is unauthentic.

In some examples, the unauthentic electronic control unit (e.g., electronic control unit 347 in FIG. 3) can be reported to host 202. The host 202 can display a message (e.g., message 350 in FIG. 3) and/or send a message in response to the run-time cryptographic hash 241 and the golden hash 245 being unequal (e.g., the electronic control unit being unauthentic). The message can identify the electronic control unit and classify the electronic control unit as unauthentic and/or improperly installed, for example.

The run-time cryptographic hash 241 can be generated and/or compared with the golden hash 243 in response to circuitry 210 detecting a powering of the computing system 200, the memory device 206, the electronic control unit (e.g., electronic control unit 347 in FIG. 3), and/or the vehicle (e.g., vehicle 351 in FIG. 3).

The embodiment illustrated in FIG. 2 can include additional circuitry, logic, and/or components not illustrated so as not to obscure embodiments of the present disclosure. For example, memory device 206 can include address circuitry to latch address signals provided over I/O connectors through I/O circuitry. Address signals can be received and decoded by a row decoder and a column decoder, to access memory array 201. Further, memory device 206 can include a main memory, such as, for instance, a DRAM or SDRAM, that is separate from and/or in addition to memory array 201. An example further illustrating additional circuitry, logic, and/or components of memory device 206 will be further described herein (e.g., in connection with FIG. 10).

FIG. 3 is a block diagram of an example of an electronic control unit validation process 361 in accordance with an embodiment of the present disclosure. The electronic control validation process 361 can include generating a run-time cryptographic hash 341 using circuitry (e.g., circuitry 210 in FIG. 2) and by applying a cryptographic hash function 365. The run-time cryptographic hash 341 can be used for validating (e.g., authenticating and/or attesting) the data 363, including ID number (e.g., ID number 245 in FIG. 2), stored in memory 316 (e.g., in memory array 301). The ID number can be received by the memory 316 from the electronic control unit 347 via interface 349.

In a number of embodiments, the electronic control unit validation process 361 can include validating a plurality of electronic control units and the electronic control validation process 316 can include generating a run-time cryptographic hash for validating the data 363, including each ID number of each of the plurality of electronic control units.

As used herein, validating the data 363 stored in memory array 301 can include, and/or refer to, authenticating and/or attesting that the electronic control unit 347 is genuine (e.g., original, authorized, provided by factory, properly installed, and/or installed by a certified person), and has not been installed or replaced with in unauthorized electronic control unit and/or installed improperly. The run-time cryptographic hash 341 can be generated by reading data 363, including the ID number (e.g., ID number 245 in FIG. 2), stored in memory array 301 and applying a cryptographic hash function 365 to hash the data 363. In some examples, the cryptographic hash function 365 can be a SHA-256 cryptographic hash function.

The run-time cryptographic hash 341 (e.g., run-time cryptographic hash 241 in FIG. 2) can be stored in memory array 301 (e.g., memory array 201 in FIG. 2). For example, the run-time cryptographic hash 341 can be stored in a portion of memory array 301 that is inaccessible to a user of memory device (e.g., memory device 206 in FIG. 2) and/or host (e.g., host 202 in FIG. 2).

In an embodiment, memory array 301 (e.g., a subset of array 301, or the whole array 301) can be a secure array (e.g., an area of memory 316 to be kept under control). For example, the data stored in memory array 301 can include sensitive (e.g., non-user) data, such as host firmware and/or code to be executed for sensitive applications. In such an embodiment, a pair of non-volatile registers can be used to define the secure array. For example, in the embodiment illustrated in FIG. 2, circuitry 210 includes registers 214-1 and 214-2 that can be used to define the secure array. Once the secure array has been defined, circuitry can generate (e.g., calculate) a cryptographic hash 343 associated with the secure array, which may be referred to herein as a golden hash 343, using authenticated and antireplay protected commands (e.g., so that only memory device knows the golden hash 343, and only the memory device is capable of generating and updating it).

In some examples, the golden hash 343 can be received by the memory 316, stored in inaccessible portion of memory array 301, and can be used during the process 361 of validating the electronic control unit 347. The golden hash 343 can be sent from a mechanic, dealer, and/or manufacturer, for example. In some examples, an updated golden hash can be sent from a mechanic, dealer, and/or manufacturer in response to a mechanic, dealer, and/or manufacturer replacing the electronic control unit 347 on the vehicle 351 and an updated run-time cryptographic hash can be generated based on an ID number of the replacement electronic control unit and compared with the updated golden hash.

The process 361 of validating the electronic control unit 347 can begin in response to a powering (e.g., a powering on and/or powering up) of memory device (e.g., memory device 206 in FIG. 2), the electronic control unit 347, and/or the vehicle 351. As such, a validation of the electronic control unit 347 can be initiated (e.g., automatically) upon the powering of the memory device, the electronic control unit 347, and/or the vehicle 351.

As an additional example, the process 361 of validating the electronic control unit 347 can be initiated in response to receiving a command from the host (e.g., host 202 in FIG. 2) to initiate a validation of the data 363, including the ID number (e.g., ID number 245 in FIG. 2), stored in the memory array 301.

The run-time cryptographic hash 341 can be generated (e.g., calculated), and compared with the golden hash 343. If the comparison 367 indicates the run-time cryptographic hash 341 and golden hash 343 match (e.g., equal), it can be determined that the ID number (e.g., ID number 245 in FIG. 2) is valid 369, and therefore the electronic control unit 347 is authentic and the process 361 of validating the electronic control unit 347 can be complete. If, however, the comparison 367 indicates the run-time cryptographic hash 341 and golden hash 343 do not match, this may indicate that the ID number is not valid 371, and therefore the electronic control unit 347 is unauthentic.

In some examples, the unauthentic electronic control unit 347 can be reported to a host (e.g., host 202 in FIG. 2). The host can display a message 350, for example on an infotainment system of the vehicle 351, and/or send a message 350, for example to the vehicle dealer, manufacturer, and/or someone warrantying the vehicle, in response to the electronic control unit being unauthentic. The message can identify the electronic control unit 347 and classify the electronic control unit 347 as unauthentic and/or improperly installed, for example.

The message 350 can be removed in response to an updated golden hash and an updated run-time cryptographic hash being equal. For example, an updated golden hash can be sent from a mechanic, dealer, and/or manufacturer in response to a mechanic, dealer, and/or manufacturer replacing the electronic control unit 347 on the vehicle 351 and an updated run-time cryptographic hash can be generated based on an ID number of the replacement electronic control unit and compared with the updated golden hash.

In some embodiments, the vehicle 351 can be powered off and/or features of the vehicle 351 can be unavailable (e.g., disabled) in response to the run-time cryptographic hash 341 and the cryptographic hash 343 being unequal. For example, an autonomous driving feature can be unavailable if the unauthentic electronic control unit 347 is related to the functionality of the autonomous driving feature. Making the autonomous driving feature unavailable can prevent injury or death to passengers in the autonomous vehicle 351 resulting from the electronic control unit 347 malfunctioning and/or failing as a result of the electronic control unit 347 being unauthentic or installed by an uncertified mechanic, for example.

The vehicle 351 can be powered on and/or features of the vehicle 351 can be available (e.g., enabled) in response to an updated golden hash and an updated run-time cryptographic hash being equal. For example, an updated golden hash can be sent from a mechanic, dealer, and/or manufacturer in response to a mechanic, dealer, and/or manufacturer replacing the electronic control unit 347 on the vehicle 351 and an updated run-time cryptographic hash can be generated based on an ID number of the replacement electronic control unit and compared with the updated golden hash.

The run-time cryptographic hash 341 can be generated and/or compared with the golden hash 343 in response to detecting powering (e.g., a powering on and/or powering up) of memory device (e.g., memory device 206 in FIG. 2), the electronic control unit 347, and/or the vehicle 351.

Figure 4A:
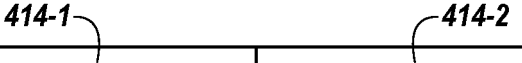
FIG. 4A illustrates an example of a pair of registers used to define a secure memory array in accordance with an embodiment of the present disclosure.
Figure 4B:
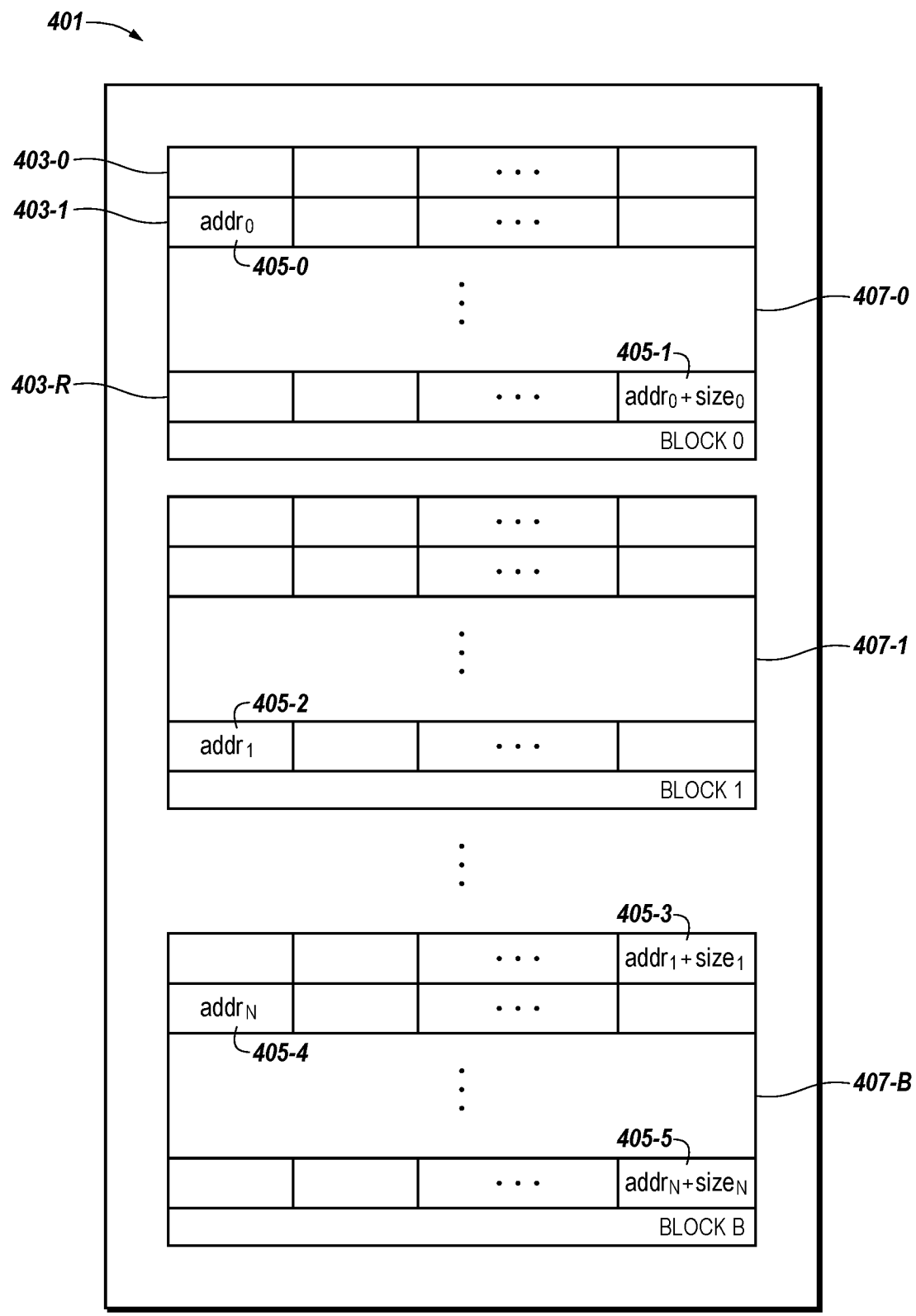
FIG. 4B illustrates a diagram of a portion of a memory array that includes a secure memory array defined in accordance with an embodiment of the present disclosure.

FIG. 4A illustrates an example of a pair of registers 414-1 and 414-2 used to define a secure memory array in accordance with an embodiment of the present disclosure, and FIG. 4B illustrates a diagram of a portion of a memory array 401 that includes a secure memory array defined using registers 414-1 and 414-2 in accordance with an embodiment of the present disclosure. Registers 414-1 and 414-2 can be, for instance, registers 214-1 and 214-2, respectively, previously described in connection with FIG. 2, and secure memory array 401 can be, for instance, memory array 201 previously described in connection with FIG. 2. For instance, as shown in FIG. 4B, secure memory array 401 can include a number of physical blocks 407-0, 407-1, . . . , 407-B of memory cells, each including a number of physical rows 403-0, 403-1, . . . , 403-R having a number of sectors of memory cells, in a manner analogous to memory array 101 previously described in connection with FIG. 1.

As shown in FIG. 4A, register 414-1 can define different addresses of the secure array (e.g., the addresses of different portions of the secure array), and register 414-2 can define sizes of the secure array (e.g., the sizes of the different portions of the secure array). The addresses of the secure array defined by register 414-1 can correspond to, for instance, starting points (e.g., starting LBAs) of the secure array (e.g., the starting points of the different portions of the secure array), and the sizes of the secure array defined by register 414-2 can correspond to, for instance, ending points (e.g., ending LBAs) of the secure array (e.g., the ending points of the different portions of the secure array).

For example, as shown in FIG. 4A, registers 414-1 and 414-2 can define N pairs of values, with each respective pair comprising an address value (e.g., addr) defined by register 414-1 and a size value (e.g., size) defined by register 414-2. For instance, in the example illustrated in FIG. 4A, $Pair_0$ comprises address value $addr_0$ and size value $size_0$ (e.g., $Pair_0=[addr_0, size_0]$), $Pair_1$ comprises address value $addr_1$ and size value $size_1$ (e.g., $Pair_1=[addr_1, size_1]$), and so on, with $Pair_N$ comprising address value $addr_N$ and size value $size_N$ (e.g., $Pair_N=[addr_N, size_N]$). The address value of a pair can correspond to a starting point (e.g., starting LBA) of a portion of the secure array, and the sum of the address value and the size value of that pair can correspond to the ending point (e.g., ending LBA) of that portion of the secure array. As such, the entire secure array (e.g., the portions that comprise the entire secure array) can be given by: $[addr_0, addr_0+size_0] \cup [addr_1, addr_1+size_1] \cup \ldots \cup [addr_N, addr_N+size_N]$.

The first pair whose size value defined by register 414-2 is zero can stop the definition of the secure array. For instance, in the example illustrated in FIG. 4A, if the size value of $Pair_2$ is zero, then the secure array would be given by: $[addr_0, addr_0+size_0] \cup [addr_1, addr_1+size_1]$.

An example of a secure array defined by registers 414-1 and 414-2 (e.g., with all size values defined by register 414-2 as non-zero) is illustrated in FIG. 4B. For instance, as shown in FIG. 4B, the address (e.g., LBA) associated with sector 405-0 of memory array 401 is $addr_0$, the address associated with sector 405-1 of memory array 401 is $addr_0+size_0$, the address associated with sector 405-2 of memory array 401 is $addr_1$, the address associated with sector 405-3 of memory array 401 is $addr_1+size_1$, the address associated with sector 405-4 of memory array 401 is $addr_N$, and the address associated with sector 405-5 of memory array 401 is $addr_N+size_N$. As such, the secure array comprises sectors (e.g., the data stored in sectors) 405-0 through 405-1, sectors 405-2 through 405-3, and 405-4 through 405-5. However, the sectors of memory array 401 that are before sector 405-0, and sectors 405-1 through 405-2 of memory array 401, are not part of the secure array (e.g., the secure array comprises a subset of array 401).

Figure 5:
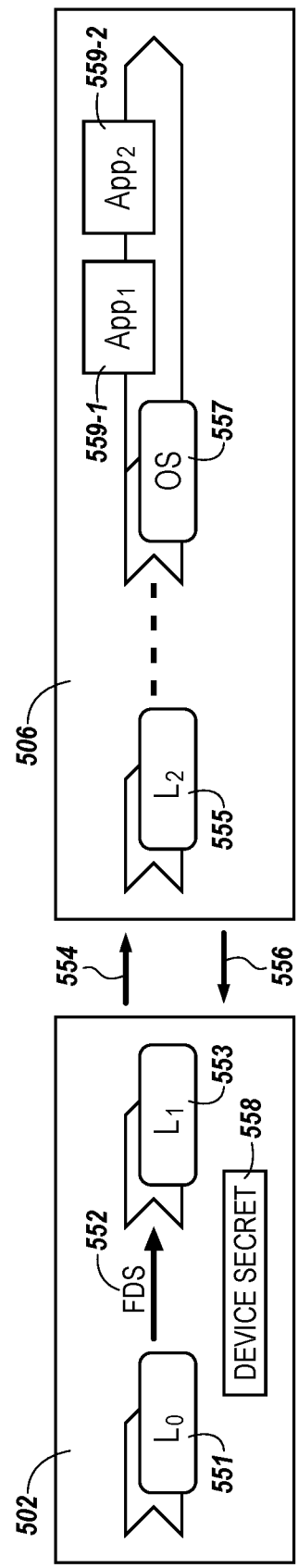
FIG. 5 is a block diagram of an example system including a host and a memory device in accordance with an embodiment of the present disclosure.

FIG. 5 is a block diagram of an example system including a host 502 and a memory device 506 in accordance with an embodiment of the present disclosure. Host 502 and memory device 506 can be, for example, host 202 and memory device 206, respectively, previously described in connection with FIG. 2.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 5, Layer 0 ("$L_0$") 551 and Layer 1 ("$L_1$") 553 are within the host. Layer 0 551 can provide a Firmware Derivative Secret (FDS) key 552 to Layer 1 553. The FDS key 552 can describe the identity of code of Layer 1 553 and other security relevant data. In an example, a particular protocol (such as robust internet of things (RIOT) core protocol) can use the FDS 552 to validate code of Layer 1 553 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 558 can be used to create the FDS 552 and be stored in memory of the host 502.

The host can transmit data, as illustrated by arrow 554, to the memory device 506. The transmitted data can include an external identification that is public, a certificate (e.g., an external identification certificate), and/or an external public key. Layer 2 ("$L_2$") 555 of the memory device 506 can receive the transmitted data and execute the data in operations of the operating system ("OS") 557 and on a first application 559-1 and a second application 559-2.

In an example operation, the host 502 can read the device secret 558, hash an identity of Layer 1 553, and perform a calculation including:

$$K_{L1} = KDF[Fs(s), \text{Hash (``immutable information'')}]$$

where $K_{L1}$ is an external public key, KDF (e.g., KDF defined in the National Institute of Standards and Technology (NIST) Special Publication 800-108) is a key derivation function (e.g., HMAC-SHA256), and Fs(s) is the device secret 558. FDS 552 can be determined by performing:

$$FDS = HMAC\text{-}SHA256\ [Fs(s), SHA256(\text{``immutable information''})]$$

Likewise, the memory device 506 can transmit data, as illustrated by arrow 556, to the host 502.

Figure 6:
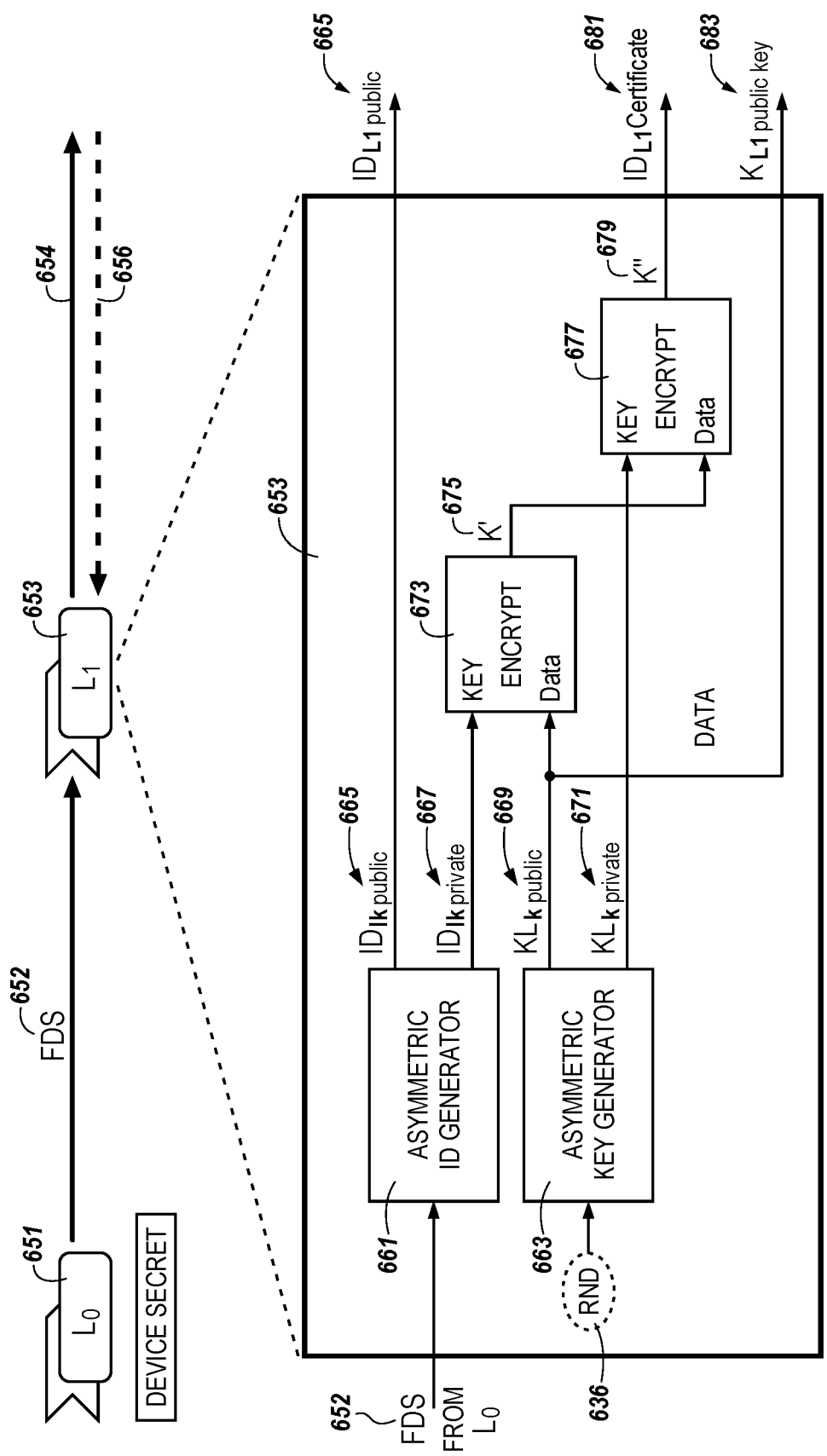
FIG. 6 is a block diagram of an example process to determine a number of parameters in accordance with an embodiment of the present disclosure.

FIG. 6 is a block diagram of an example process to determine a number of parameters in accordance with an embodiment of the present disclosure. FIG. 6 is an example of a determination of the parameters including the external public identification, the external certificate, and the external public key that are then sent, indicated by arrow 654, to Layer 2 (e.g., Layer 2 555) of a memory device (e.g., 506 in FIG. 5). Layer 0 ("$L_0$") 651 in FIG. 6 corresponds to Layer 0 551 in FIG. 5 and likewise FDS 652 corresponds to FDS 552, Layer 1 653 corresponds to Layer 1 553, and arrows 654 and 656 correspond to arrows 554 and 556, respectively.

The FDS 652 from Layer 0 651 is sent to Layer 1 653 and used by an asymmetric ID generator 661 to generate a public identification ("$ID_{lk\ public}$") 665 and a private identification 667. In the abbreviated "$ID_{lk\ public}$," the "lk" indicates Layer k (in this example Layer 1), and the "public" indicates that the identification is openly shared. The public identification 665 is illustrated as shared by the arrow extending to the right and outside of Layer 1 653 of the host. The generated private identification 667 is used as a key input into an encryptor 673. The encryptor 673 can be any processor, computing device, etc. used to encrypt data.

Layer 1 653 of a host can include an asymmetric key generator 663. In at least one example, a random number generator (RND) 636 can optionally input a random number into the asymmetric key generator 663. The asymmetric key generator 663 can generate a public key ("$K_{Lk\ public}$") 669

(referred to as an external public key) and a private key ("$K_{LK\ private}$") 671 (referred to as an external private key) associated with a host such as host 502 in FIG. 5. The external private key can be linked to a vehicle (e.g., vehicle 351 in FIG. 3). For example, the external private key can be a random number generated using a vehicle identification number (VIN) and/or other vehicle information. The external public key 669 can be an input (as "data") into the encryptor 673. The encryptor 673 can generate a result K'675 using the inputs of the external private identification 667 and the external public key 669. The external private key 671 and the result K'675 can be input into an additional encryptor 677, resulting in output K" 679. The output K" 679 is the external certificate ("$ID_{L1}$ certificate") 681 transmitted to the Layer 2 (555 of FIG. 5). The external certificate 681 can provide an ability to verify and/or authenticate an origin of data sent from a device. As an example, data sent from the host can be associated with an identity of the host by verifying the certificate, as will be described further in association with FIG. 8. Further, the external public key ("$K_{L1\ public\ key}$") 683 can be transmitted to Layer 2. Therefore, the public identification 665, the certificate 681, and the external public key 683 of a host can be transmitted to Layer 2 of a memory device.

Figure 7:
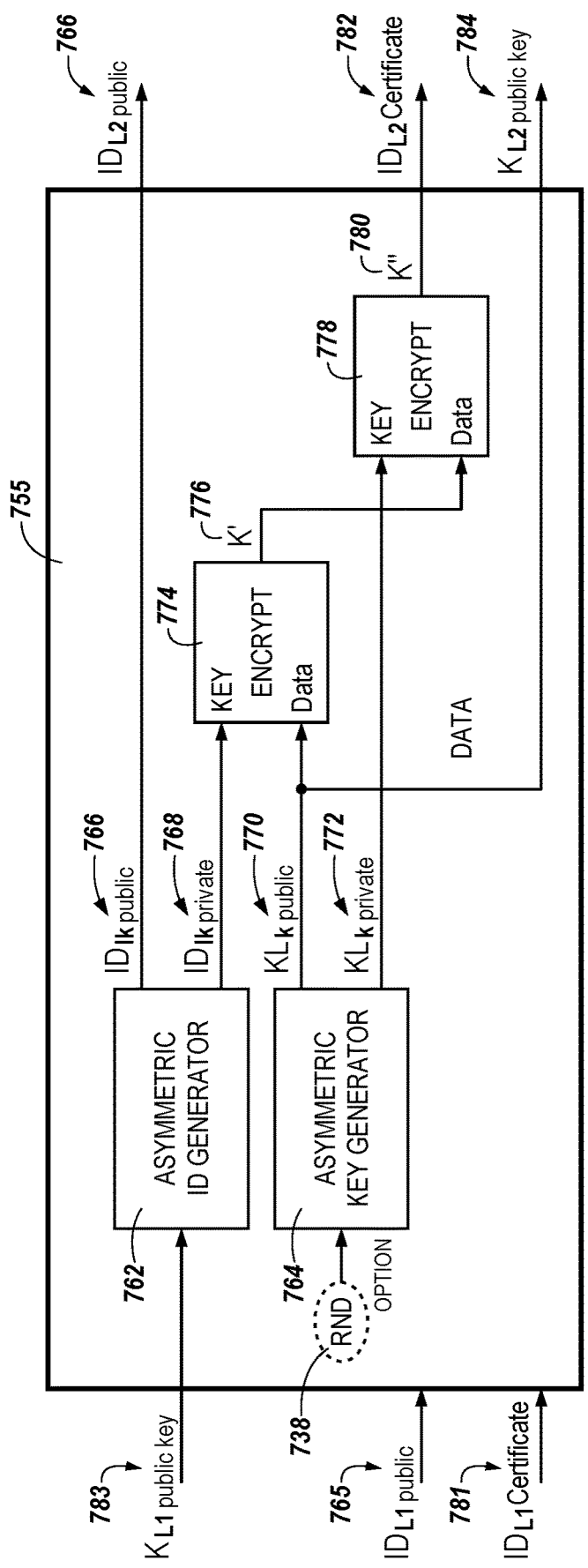
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 illustrates a Layer 2 755 of a memory device (e.g., memory device 506 in FIG. 5) generating a device identification ("$ID_{L2}$ public") 766, a device certificate ("$ID_{L2}$ Certificate") 782, and a device public key ("$K_{L2\ public\ key}$") 784.

The external public key ("$K_{L1\ public\ key}$") 783 transmitted from Layer 1 of the host to Layer 2 755 of a memory device, as described in FIG. 6, is used by an asymmetric ID generator 762 of the memory device to generate a public identification ("$ID_{lk\ public}$") 766 and a private identification 768 of the memory device. In the abbreviated "$ID_{lk\ public}$," the "lk" indicates Layer k (in this example Layer 2), and the "public" indicates that the identification is openly shared. The public identification 766 is illustrated as shared by the arrow extending to the right and outside Layer 2 755. The generated private identification 768 is used as a key input into an encryptor 774.

Layer 2 755 of the memory device can include an asymmetric key generator 764. In at least one example, a random number generator (RND) 738 can optionally input a random number into the asymmetric key generator 764. The asymmetric key generator 764 can generate a public key ("$K_{Lk\ public}$") 770 (referred to as a device public key) and a private key ("$K_{LK\ private}$") 772 (referred to as a device private key) associated with a memory device such as memory device 506 in FIG. 5. The device public key 770 can be an input (as "data") into the encryptor 774. The encryptor 774 can generate a result K' 776 using the inputs of the device private identification 768 and the device public key 770. The device private key 772 and the result K' 776 can be input into an additional encryptor 778, resulting in output K" 780. The output K" 780 is the device certificate ("$ID_{L2}$ certificate") 782 transmitted back to the Layer 1 (553 of FIG. 5). The device certificate 782 can provide an ability to verify and/or authenticate an origin of data sent from a device. As an example, data sent from the memory device can be associated with an identity of the memory device by verifying the certificate, as will be described further in association with FIG. 8. Further, the device public key ("$K_{L2\ public\ key}$") 784 can be transmitted to Layer 1. Therefore, the public identification 766, the certificate 782, and the device public key 784 of the memory device can be transmitted to Layer 1 of a host.

In an example, in response to a host receiving a public key from a memory device, the host can encrypt data to be sent to the memory device using the device public key. Vice versa, the memory device can encrypt data to be sent to the host using the external public key. In response to the memory device receiving data encrypted using the device public key, the memory device can decrypt the data using its own device private key. Likewise, in response to the host receiving data encrypted using the external public key, the host can decrypt the data using its own external private key. As the device private key is not shared with another device outside the memory device and the external private key is not shared with another device outside the host, the data sent to the memory device and the host remains secure.

Figure 8:
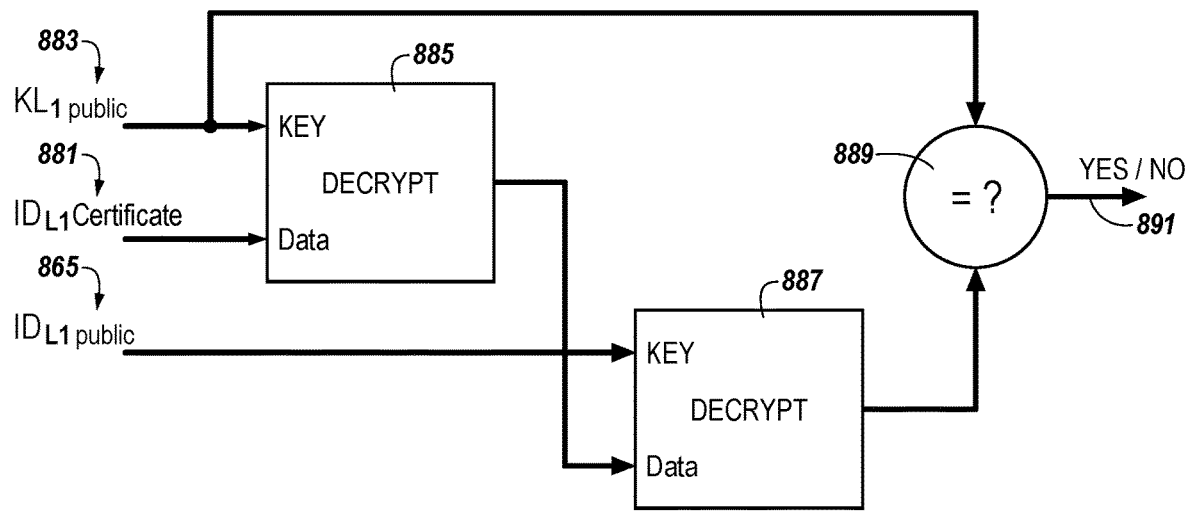
FIG. 8 is a block diagram of an example process to verify a certificate in accordance with an embodiment of the present disclosure.

FIG. 8 is a block diagram of an example process to verify a certificate in accordance with an embodiment of the present disclosure. In the illustrated example of FIG. 8, a public key 883, a certificate 881, and a public identification 865 is provided from a host (e.g., from Layer 1 553 of host 502 in FIG. 5). The data of the certificate 881 and the external public key 883 can be used as inputs into a decryptor 885. The decryptor 885 can be any processor, computing device, etc used to decrypt data. The result of the decryption of the certificate 881 and the external public key 883 can be used as an input into a secondary decryptor 887 along with the public identification, result in an output. The external public key 883 and the output from the decryptor 887 can indicate, as illustrated at 889, whether the certificate is verified, resulting in a yes or no 891 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 9:
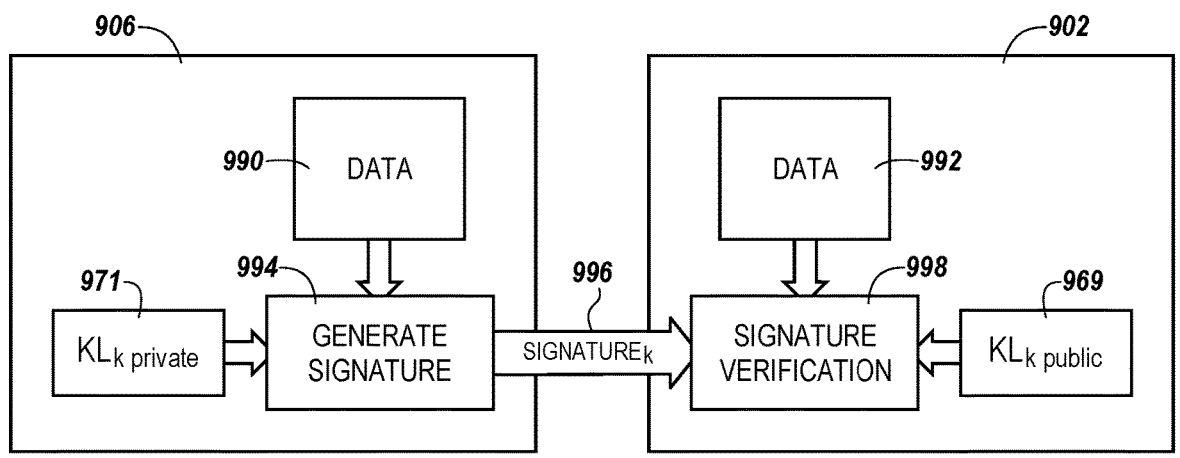
FIG. 9 is a block diagram of an example process to verify a signature in accordance with an embodiment of the present disclosure.

FIG. 9 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A memory device 906 (such as memory device 206 in FIG. 2) can send data 990 to a host (such as host 202 in FIG. 2). The memory device 906 can generate, at 994, a signature 996 using a device private key 971. The signature 996 can be transmitted to the host 902. The host 902 can verify, at 998, the signature using data 992 and the external public key 969 previously received. In this way, the signature is generated using a private key and verified using a public key. In this way, a unique signature for each device can remain private to the device sending the signature while allowing the receiving device to be able to decrypt the signature for verification. This is in contrast to encryption/decryption of the data, which is encrypted by the sending device using the public key of the receiving device and decrypted by the receiving device using the private key of the receiver. In at least one example, the device can verify the digital signature by using an internal cryptography process (e.g., Elliptical Curve Digital signature (ECDSA) or a similar process.

Figure 10:
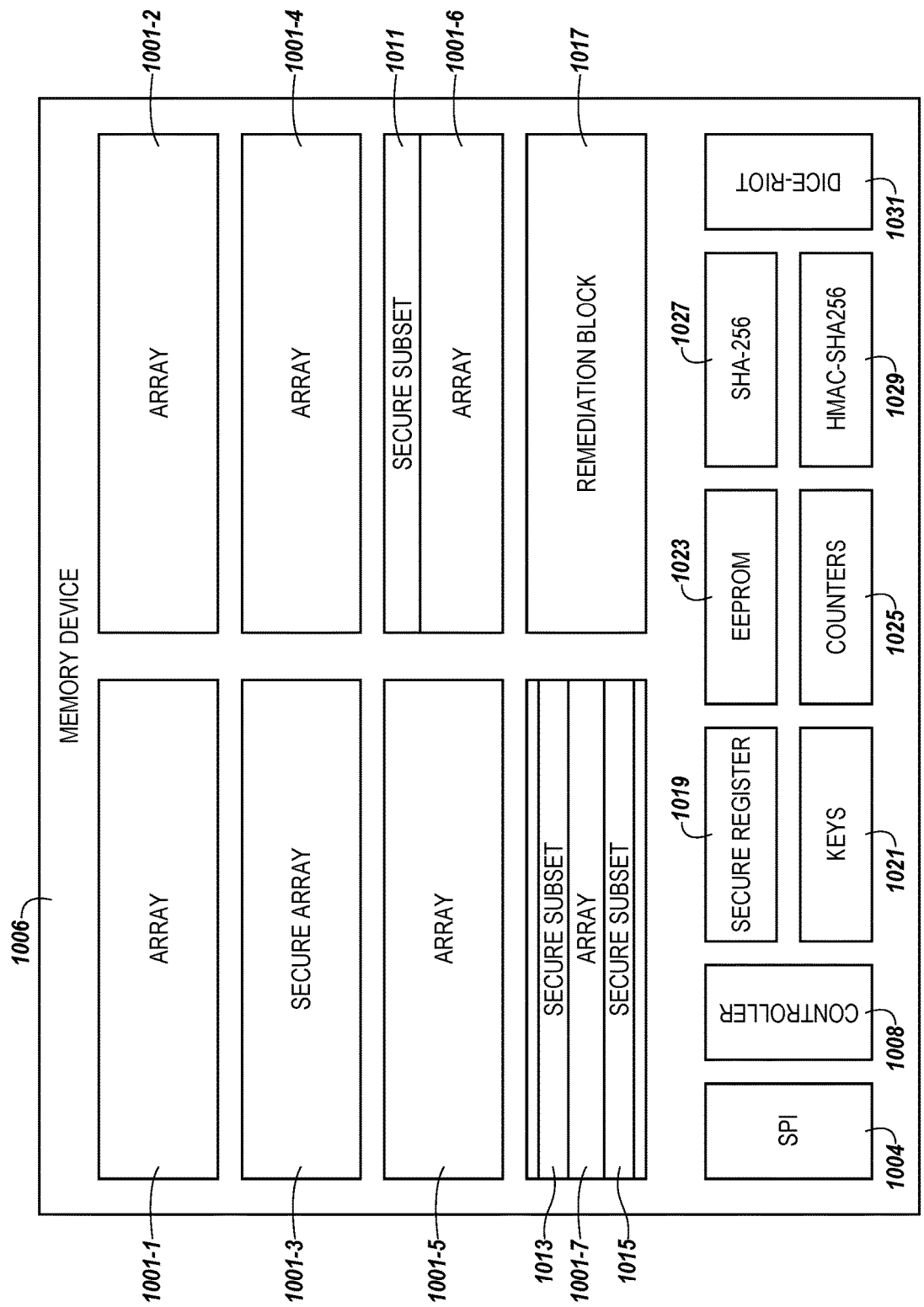
FIG. 10 is a block diagram of an example memory device in accordance with an embodiment of the present disclosure.

FIG. 10 is a block diagram of an example memory device 1006 in accordance with an embodiment of the present disclosure. Memory device 1006 can be, for example, memory device 206 previously described in connection with FIG. 2.

As shown in FIG. 10, memory device 1006 can include a number of memory arrays 1001-1 through 1001-7. Memory arrays 1001-1 through 1001-7 can be analogous to memory array 101 previously described in connection with FIG. 1. Further, in the example illustrated in FIG. 10, memory array 1001-3 is a secure array, subset 1011 of memory array 1001-6 comprises a secure array, and subsets 1013 and 1015 of memory array 1001-7 comprise a secure array. Subsets 1011, 1013, and 1015 can each include, for instance, 4 kilobytes of data. However, embodiments of the present disclosure are not limited to a particular number or arrangement of memory arrays or secure arrays.

As shown in FIG. 10, memory device 1006 can include a remediation (e.g., recovery) block 1017. Remediation block 1017 can be used as a source of data in case of errors (e.g., mismatches) that may occur during operation of memory device 1006. Remediation block 1017 may be outside of the area of memory device 1006 that is addressable by a host.

As shown in FIG. 10, memory device 1006 can include a serial peripheral interface (SPI) 1004 and a controller 1008. Memory device 1006 can use SPI 1004 and controller 1008 to communicate with a host and memory arrays 1001-1 through 1001-7, as previously described herein (e.g., in connection with FIG. 2).

As shown in FIG. 10, memory device 1006 can include a secure register 1019 for managing the security of memory device 1006. For example, secure register 1019 can configure, and communicate externally, to an application controller. Further, secure register 1019 may be modifiable by an authentication command.

As shown in FIG. 10, memory device 1006 can include keys 1021. For instance, memory device 1006 can include eight different slots to store keys such as root keys, DICE-RIOT keys, and/or other external session keys.

As shown in FIG. 10, memory device 1006 can include an electronically erasable programmable read-only memory (EEPROM) 1023. EEPROM 1023 can provide a secure non-volatile area available for a host, in which individual bytes of data can be erased and programmed.

As shown in FIG. 10, memory device 1006 can include counters (e.g., monotonic counters) 1025. Counters 1025 can be used as an anti-replay mechanism (e.g., freshness generator) for commands (e.g., to sign a command set or sequence) received from and/or sent to a host. For instance, memory device 1006 can include six different monotonic counters, two of which may be used by memory device 1006 for the authenticated commands, and four of which may be used by the host.

As shown in FIG. 10, memory device 1006 can include an SHA-256 cryptographic hash function 1027, and/or an HMAC-SHA256 cryptographic hash function 1029. SHA-256 and/or HMAC-SHA256 cryptographic hash functions 1027 and 1029 can be used by memory device 1006 to generate cryptographic hashes, such as, for instance, the cryptographic hashes of block 220 previously described herein, and/or a golden hash used to validate the data stored in memory arrays 1001-1 through 1001-7 as previously described herein. Further, memory device 1006 can support L0 and L1 of DICE-RIOT 1031.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory comprising a secure array; and
circuitry comprising one or more registers, wherein the circuitry is configured to:
define an address of the secure array via the one or more registers;
generate a cryptographic hash associated with the secure array responsive to defining the address of the secure array;
compare a run-time cryptographic hash with the cryptographic hash stored in the secure array;
determine an electronic control unit is unauthentic in response to the run-time cryptographic hash and the cryptographic hash being unequal;
receive an updated cryptographic hash in response to replacing the electronic control unit;
store the updated cryptographic hash in the secure array;
generate an updated run-time cryptographic hash based on an identification (ID) number of the replacement electronic control unit;
compare the updated run-time cryptographic hash with the updated cryptographic hash; and
validate the replacement electronic control unit in response to the updated run-time cryptographic hash and the updated cryptographic hash being equal.

2. The apparatus of claim 1, wherein the circuitry is configured to report the electronic control unit as unauthenticated in response to the run-time cryptographic hash and the cryptographic hash being unequal.

3. The apparatus of claim 1, wherein the circuitry is configured to generate the updated run-time cryptographic hash using a hash function.

4. The apparatus of claim 1, wherein the secure array is configured to be inaccessible to a user of the memory and a host.

5. The apparatus of claim 1, wherein the secure array is configured to store host firmware.

6. A method, comprising:
defining an address of a secure array of a memory via one or more registers;
generating a cryptographic hash associated with the secure array responsive to defining the address of the secure array;
detecting a power on of a vehicle;
comparing a run-time cryptographic hash with the cryptographic hash stored in the secure array in response to detecting the power on;
determining an electronic control unit is unauthentic in response to the run-time cryptographic hash and the cryptographic hash being unequal;
receiving an updated cryptographic hash in response to replacing the electronic control unit;
storing the updated cryptographic hash in the secure array;
generating an updated run-time cryptographic hash;
comparing the updated run-time cryptographic hash with the updated cryptographic hash;
determining the replacement electronic control unit is authentic in response to the updated run-time cryptographic hash and the updated cryptographic hash being equal; and
determining the replacement electronic control unit is unauthentic in response to the updated run-time cryptographic hash and the updated cryptographic hash being unequal.

7. The method of claim 6, wherein the method includes sending or displaying a message in response to the run-time cryptographic hash and the cryptographic hash being unequal or the updated run-time cryptographic hash and the updated cryptographic hash being unequal.

8. The method of claim 7, wherein the message identifies the electronic control unit or the replacement electronic control unit as unauthentic.

9. The method of claim 7, wherein the method includes sending the message to a dealer of the vehicle, manufacturer of the vehicle, or someone warrantying the vehicle.

10. The method of claim 6, wherein the method includes generating the run-time cryptographic hash based on an identification (ID) number of the electronic control unit in response to detecting the power on of the vehicle.

11. The method of claim 6, wherein the method includes generating the updated run-time cryptographic hash based on an identification (ID) number of the replacement electronic control unit.

12. A system, comprising:
an electronic control unit;
a memory comprising a secure array; and
circuitry comprising one or more registers, wherein the circuitry is configured to:
receive a cryptographic hash in response to installing the electronic control unit in the system;
define an address of the secure array via the one or more registers;
store the cryptographic hash in the secure array;
generate a run-time cryptographic hash by reading data stored in a portion of the memory and using a hash function to hash the data;
compare the run-time cryptographic hash with the received cryptographic hash;
determine the electronic control unit is unauthentic in response to the run-time cryptographic hash and the cryptographic hash being unequal;
receive an updated cryptographic hash in response to replacing the electronic control unit;
store the updated cryptographic hash in the secure array;
generate an updated run-time cryptographic hash based on an identification (ID) number of the replacement electronic control unit;
compare the updated run-time cryptographic hash with the updated cryptographic hash; and
report the replacement electronic control unit as authenticated to a host in response to the updated run-time cryptographic hash and the updated cryptographic hash being equal.

13. The system of claim 12, wherein the updated cryptographic hash comprises a SHA-256 cryptographic hash.

14. The system of claim 12, wherein the circuitry is configured to power off the system in response to the run-time cryptographic hash and the cryptographic hash being unequal.

15. The system of claim 14, wherein the circuitry is configured to power on the system in response to the updated run-time cryptographic hash and the updated cryptographic hash being equal.

16. The system of claim 12, wherein the circuitry is configured to disable a feature of the system in response to the run-time cryptographic hash and the cryptographic hash being unequal.

17. The system of claim 16, wherein the circuitry is configured to enable the feature of the system in response to the updated run-time cryptographic hash and the updated cryptographic hash being equal.

* * * * *